(12) United States Patent
Ogawa

(10) Patent No.: US 9,183,009 B2
(45) Date of Patent: Nov. 10, 2015

(54) POLICY UPDATE APPARATUS, POLICY MANAGEMENT SYSTEM, POLICY UPDATE METHOD, POLICY MANAGEMENT METHOD AND RECORDING MEDIUM

(75) Inventor: Ryuichi Ogawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 263 days.

(21) Appl. No.: 13/819,641

(22) PCT Filed: Jun. 20, 2012

(86) PCT No.: PCT/JP2012/066304
§ 371 (c)(1),
(2), (4) Date: Feb. 27, 2013

(87) PCT Pub. No.: WO2012/176922
PCT Pub. Date: Dec. 27, 2012

(65) Prior Publication Data
US 2013/0290695 A1    Oct. 31, 2013

(30) Foreign Application Priority Data

Jun. 20, 2011 (JP) ................................ 2011-136487

(51) Int. Cl.
*G06F 1/24* (2006.01)
*G06F 9/00* (2006.01)
(Continued)

(52) U.S. Cl.
CPC ............ *G06F 9/44505* (2013.01); *G06F 21/57* (2013.01); *G06F 8/65* (2013.01); *G06F 17/30082* (2013.01); *H04L 63/0263* (2013.01)

(58) Field of Classification Search
CPC . G06F 8/65; G06F 9/44505; G06F 17/30082; G06F 21/57; H04L 63/0263
USPC .......................................................... 713/100
See application file for complete search history.

(56) References Cited

U.S. PATENT DOCUMENTS 7,437,441 B1 * 10/2008 Drew et al. .................... 709/223
7,971,232 B2 * 6/2011 Hasbun ............................. 726/2
(Continued)

FOREIGN PATENT DOCUMENTS

| JP | 2004-046445 A | 2/2004 |
| JP | 2006-058938 A | 3/2006 |
| JP | 2006-126914 A | 5/2006 |

OTHER PUBLICATIONS

International Search Report of PCT/JP2012/066304, dated Sep. 4, 2012.
(Continued)

*Primary Examiner* — Jaweed A Abbaszadeh
*Assistant Examiner* — Xuxing Chen
(74) *Attorney, Agent, or Firm* — Sughrue Mion, PLLC

(57) ABSTRACT

The present invention provides a policy update apparatus which can update a software policy appropriately corresponding to the configuration change in a resource. The policy update apparatus includes policy retrieving means which receives a resource identifier, reads out an install destination resource identifier corresponding to the resource identifier from resource management means which stores with providing a mapping between the resource identifier and the install destination resource identifier which indicates an install destination resource in which the resource identified by the resource identifier is installed, and reads out the software policy corresponding to the resource identifier and the install destination resource identifier, and policy update means which updates the software policy, correlates the updated software policy to the resource identifier and the install destination resource identifier, and stores to policy storage means.

12 Claims, 20 Drawing Sheets

(51) Int. Cl.
*G06F 9/445* (2006.01)
*G06F 21/57* (2013.01)
*H04L 29/06* (2006.01)
*G06F 17/30* (2006.01)

(56) References Cited

U.S. PATENT DOCUMENTS

2006/0041928 A1 2/2006 Masuoka
2008/0072229 A1* 3/2008 Kirton et al. ............... 718/104
2013/0173530 A1* 7/2013 Laron ........................ 707/608

OTHER PUBLICATIONS

Ogawa, Ryuichi, et al., "Access Policy Management Architecture for Virtual Server Consolidation Systems", Information Processing Society of Japan Research Report, The Institute of Electronics Information and Communication Engineers, Aug. 15, 2010, pp. 1-12.

Ogawa, Ryuchi, et al., "Research and Development for Supporting Future Cloud Fundamental Technology", NEC Technical Report, NEC Technical Journal, Apr. 23, 2010, vol. 63, No. 2, pp. 129-133.

* cited by examiner

Fig.2

| SOFTWARE POLICY | RESOURCE IDENTIFIER | INSTALL DESTINATION RESOURCE IDENTIFIER |
|---|---|---|
| Config1 | RID1 | RID2 |
| Config2 | RID2 | RID3 |
| Config3 | RID3 | Mon1 |

Fig.3

```
version 3.0;
acl "default;
authenticate (user, group) { prompt = "XXX Web Server"; };
allow (read, execute, info) user = "anyone";
allow (list, write, delete) user = "all";
acl "es-internal";
allow (read, execute, info) user = "anyone";
deny (list, write, delete) user = "anyone";
```

Fig.7

| SOFTWARE POLICY | RESOURCE IDENTIFIER | SOFTWARE IDENTIFIER | INSTALL DESTINATION RESOURCE IDENTIFIER |
|---|---|---|---|
| Config1 | RID1 | VM1 | RID2 |
| Config2 | RID2 | XXX Server 2003 | RID3 |
| Config3 | RID3 | YYY 11g Standard | Mon1 |

Fig.8

| SOFTWARE POLICY (C1) | SOFTWARE IDENTIFIER (C2) |
|---|---|
| DefaultConfig1 | XXX Server **** |
| DefaultConfig2 | YYY 11g Standard |
| DefaultConfig3 | VM1 |

Fig.11

| SOFTWARE POLICY | RESOURCE IDENTIFIER | INSTALL DESTINATION RESOURCE IDENTIFIER | UPDATE HISTORY |
| --- | --- | --- | --- |
| Config1 | RID1 | RID2 | UpdateLog1 |
| Config2 | RID2 | RID3 | UpdateLog2 |
| Config3 | RID3 | Mon1 | UpdateLog3 |

| CLUSTER POLICY E1 | RESOURCE IDENTIFIER E2 | INSTALL DESTINATION RESOURCE IDENTIFIER E3 | CLUSTER GROUP IDENTIFIER E4 | SERVER IDENTIFIER IN THE CLUSTER E5 |
|---|---|---|---|---|
| ClusterConfig1 | RID1 | RID2 | Cluster1 | Server1 |
| ClusterConfig2 | RID2 | RID3 | Cluster1 | Server2 |
| ClusterConfig3 | RID3 | Mon1 | Cluster1 | Server3 |

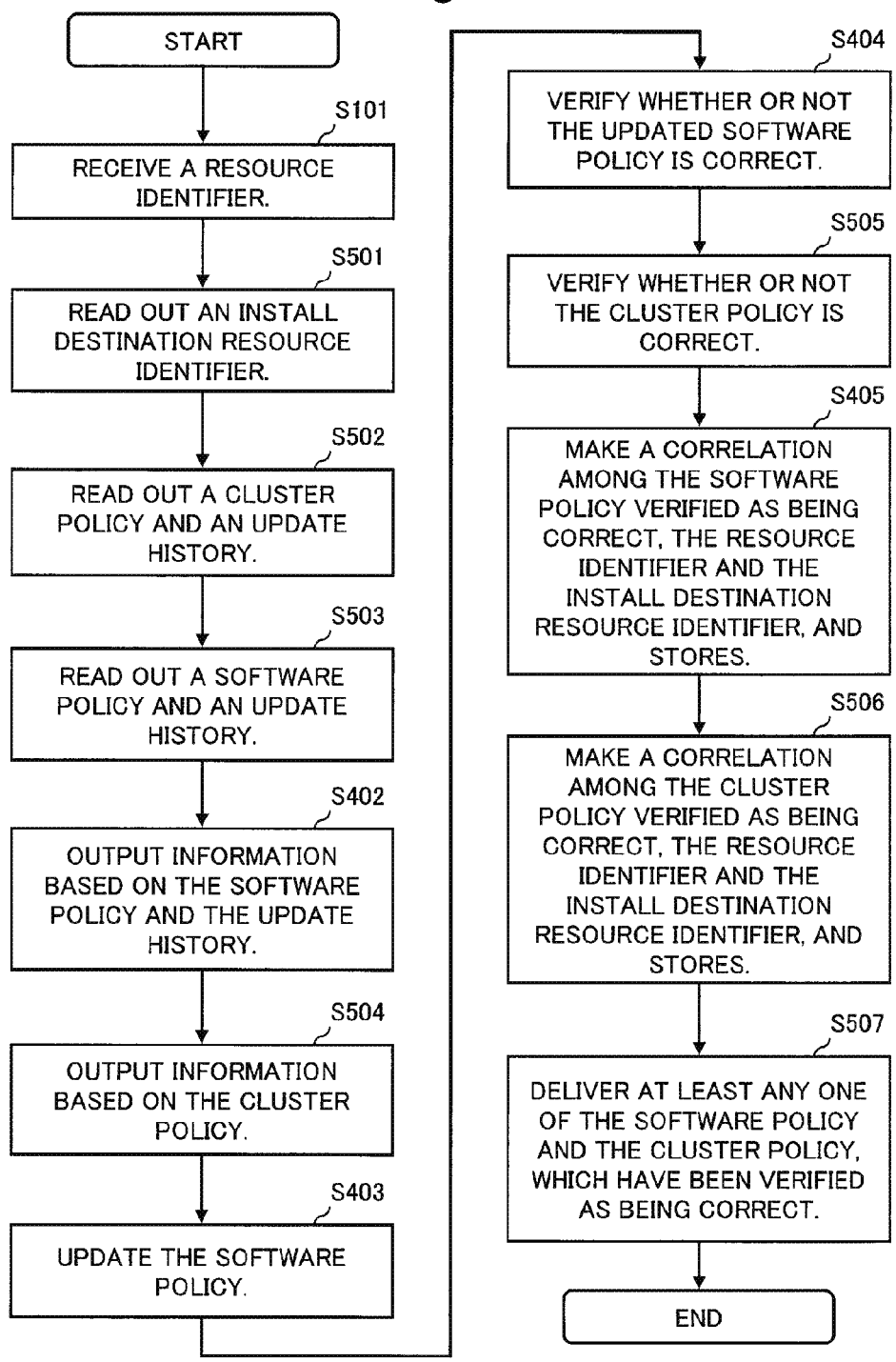

POLICY UPDATE APPARATUS, POLICY MANAGEMENT SYSTEM, POLICY UPDATE METHOD, POLICY MANAGEMENT METHOD AND RECORDING MEDIUM

CROSS REFERENCE TO RELATED APPLICATIONS

This is a National Stage of International Application No. PCT/JP2012/066304 filed Jun. 20, 2012, claiming priority based on Japanese Patent Application No. 2011-136487 filed Jun. 20, 2011, the contents of all of which are incorporated herein by reference in their entirety.

TECHNICAL FIELD

The present invention relates to technology which manages a software policy which is setting information to a resource.

BACKGROUND ART

Technology which manages a software policy which is setting information to a resource is known.

For example, technology disclosed in patent document 1 distributes and applies an environmental definition file to a computer based on an input of an environmental definition parameter value by an operator. This environmental definition file is managed in a lump as a system configuration file.

PATENT DOCUMENTS

[Patent document 1] Japanese Patent Application Publication No. 2004-46445

SUMMARY OF THE INVENTION

Problem to be Solved by the Invention

However, the technology disclosed in patent document 1 is not equipped with means to cope with a configuration change. Accordingly, in a system and a method using the technology, to a computer to which the environmental definition file has been applied, update is performed based on the previous system configuration file managed by the system even when its configuration has changed. Then, according to the change in the configuration of the system, the operator has to update the system configuration file based on the system configuration file which is being applied before the change in its configuration. For this reason, update work of the system configuration file when the configuration has changed will be complex work. In particular, in the environment like the cloud, increase and decrease of virtualized servers, increase and decrease of storages, physical movement (migration) of virtual servers, change in resource access authorization associated with it or the like may be possible to frequently occur. Accordingly, it will be a large burden for the operator to perform setting update according to the configuration change to software on the virtual server.

Accordingly, the technology disclosed in patent document 1 cannot update the system configuration file (software policy) appropriately corresponding to the configuration change in the resource.

One of objects of the present invention is to provide a policy update apparatus, a policy management system, a policy update method and a policy management method which update a software policy appropriately corresponding to the configuration change in the resource.

Means for Solving a Problem

A first policy update apparatus according to one exemplary embodiment of the present invention includes policy storage unit which stores a software policy, which is setting information on a resource, with providing a mapping to a resource identifier which indicates said resource and an install destination resource identifier which indicates an install destination resource in which said resource is installed, policy retrieving unit which receives the resource identifier, reads out the install destination resource identifier which is correlated to said received resource identifier from resource management unit which stores the resource identifier and the install destination resource identifier which indicates the install destination resource in which the resource identified by said resource identifier is installed with providing a mapping between of them, and reads out said software policy which is correlated to said received resource identifier and said read out install destination resource identifier, and policy update unit which updates said read out software policy, correlates said updated software policy to said received resource identifier and said read out install destination resource identifier, and stores to said policy storage unit.

A first policy management system according to one exemplary embodiment of the present invention includes policy storage unit which stores a software policy, which is setting information on a resource, with providing a mapping to a resource identifier which indicates said resource and an install destination resource identifier which indicates an install destination resource in which said resource is installed, resource management unit which stores the resource identifier and the install destination resource identifier which indicates the install destination resource in which the resource identified by said resource identifier is installed with providing a mapping between of them, policy retrieving unit which receives the resource identifier, reads out the install destination resource identifier which is correlated to said received resource identifier from said resource management unit, and reads out said software policy which is correlated to said received resource identifier and said read out install destination resource identifier, and policy update unit which updates said read out software policy, correlates said updated software policy to said received resource identifier and said read out install destination resource identifier, and stores to said policy storage unit.

A first policy update method according to one exemplary embodiment of the present invention includes, storing a software policy, which is setting information on a resource, to policy storage means with providing a mapping to a resource identifier which indicates said resource and an install destination resource identifier which indicates an install destination resource in which said resource is installed, receiving the resource identifier, reading out the install destination resource identifier which is correlated to said received resource identifier from resource management means which stores the resource identifier and the install destination resource identifier which indicates the install destination resource in which the resource identified by said resource identifier is installed with providing a mapping between of them, reading out said software policy which is correlated to said received resource identifier and said read out install destination resource identifier, updating said read out software policy, correlating said updated software policy to said received resource identifier and said read out install destination resource identifier, and storing to said policy storage means.

A first policy management method according to one exemplary embodiment of the present invention includes, storing a software policy, which is setting information on a resource, to policy storage means with providing a mapping to a resource identifier which indicates said resource and an install destination resource identifier which indicates an install destination resource in which said resource is installed, storing to resource management means the resource identifier and the install destination resource identifier which indicates the install destination resource in which the resource identified by said resource identifier is installed with providing a mapping between of them, receiving the resource identifier, reading out the install destination resource identifier which is correlated to said received resource identifier from said resource management means, reading out said software policy which is correlated to said received resource identifier and said read out install destination resource identifier, updating said read out software policy, correlating said updated software policy to said received resource identifier and said read out install destination resource identifier, and storing to said policy storage means.

A first non-transitory computer-readable recording medium according to one exemplary embodiment of the present invention includes a policy update program which causes a computer to execute the processing which includes, processing which stores a software policy, which is setting information on a resource, to policy storage means with providing a mapping to a resource identifier which indicates said resource and an install destination resource identifier which indicates an install destination resource in which said resource is installed, receives the resource identifier, reads out the install destination resource identifier which is correlated to said received resource identifier from resource management means which stores the resource identifier and the install destination resource identifier which indicates the install destination resource in which the resource identified by said resource identifier is installed with providing a mapping between of them, and reads out said software policy which is correlated to said received resource identifier and said read out install destination resource identifier, and processing which updates said read out software policy, correlates said updated software policy to said received resource identifier and said read out install destination resource identifier, and stores to said policy storage means.

Effect of the Invention

An example of the effect of the present invention is that a software policy can be updated appropriately corresponding to the configuration change in the resource.

BRIEF DESCRIPTION OF THE DRAWINGS

FIG. 2 is a figure showing an example of information which a policy storage unit stores.
FIG. 3 is a figure showing an example of a software policy.
FIG. 7 is a figure showing an example of information which a policy storage unit according to a second exemplary embodiment stores.
FIG. 8 is a figure showing an example of information which a policy storage unit according to a third exemplary embodiment stores.
FIG. 11 is a figure showing an example of information which the policy storage unit stores.
FIG. 16 is a figure showing an example of information which the policy storage unit stores.
FIG. 20 is a flowchart showing the outline of operation of the policy management system according to the fifth exemplary embodiment.

EXEMPLARY EMBODIMENTS FOR CARRYING OUT OF THE INVENTION

Exemplary embodiments for carrying out the present invention will be described in detail with reference to drawings. Further, in each drawing and each exemplary embodiment described in the specification, the same code is given to the component having the same function.

First Exemplary Embodiment

Figure 1:
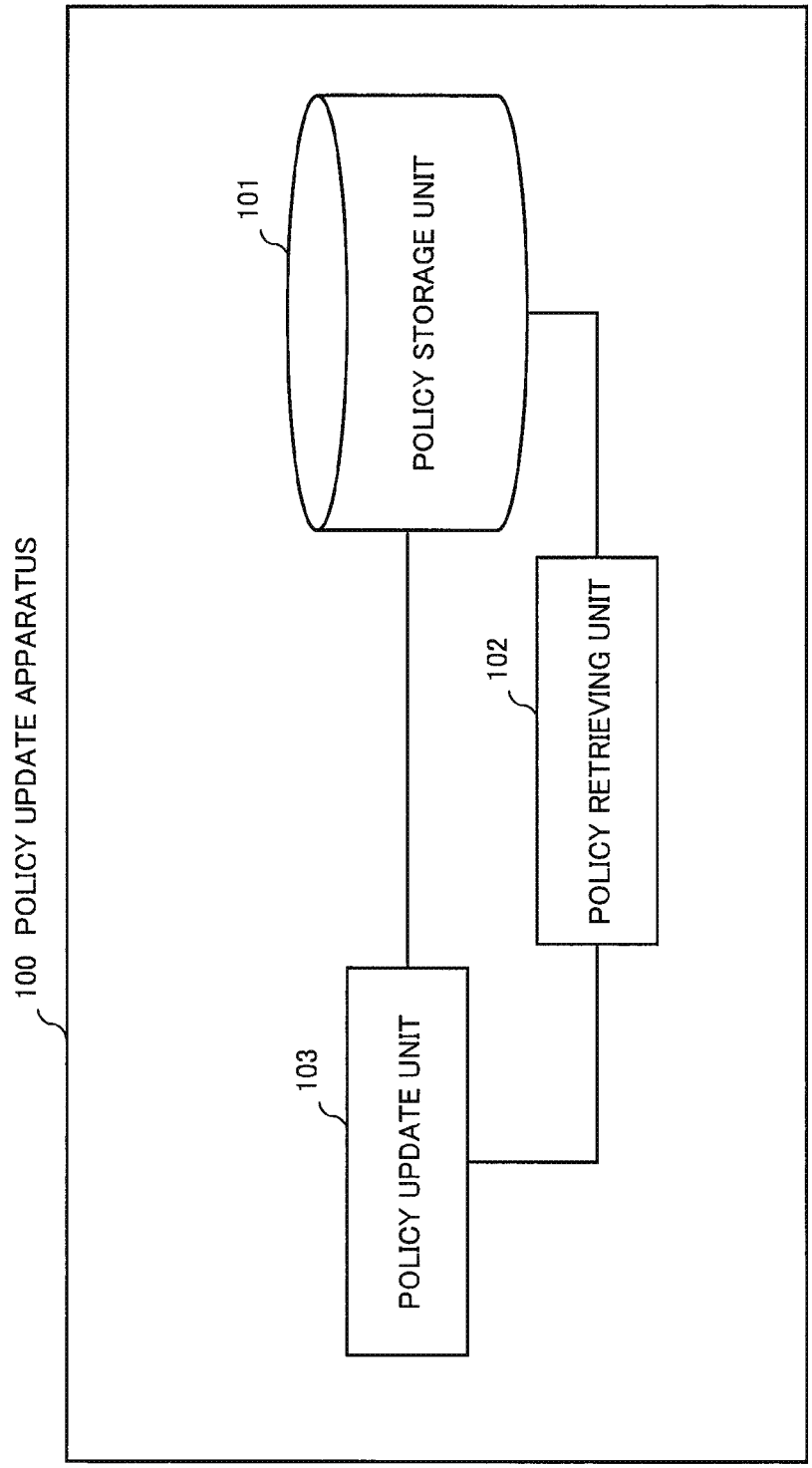
FIG. 1 is a block diagram showing a configuration of a policy update apparatus according to a first exemplary embodiment.

FIG. 1 is a block diagram showing a configuration of a policy update apparatus 100 according to a first exemplary embodiment of the present invention. When referring to FIG. 1, the policy update apparatus 100 includes a policy storage unit 101, a policy retrieving unit 102 and a policy update unit 103.

The policy update apparatus 100 is connected to, for example, a resource management unit that manages resources in a network system. And, the policy update apparatus 100 generates, sets or updates a policy for controlling setting of software provided in the resource. For example, the network system may be a large-scale computing system.

Although it will be mentioned later, the resources are, for example, a virtual machine in the network system, application software which operates on the virtual machine, an operating system, a database system, a file referred by that software, a table of the database, or the like. Further, the setting information on software provided in the resource is called a software policy.

For example, the software policy may be the environment setting information which is indispensable to software operation, the manager information on the software and the setting information including permission (Allow) and refusal (Deny) of access to the resource. The software policy itself may be managed as a file.

The policy update apparatus 100 according to the first exemplary embodiment, when it receives a resource identifier which indicates the resource, specifies the resource identifier and an install destination resource identifier which indicates other resource (install destination resource) in which the resource is installed. Here, the install destination resource in which the resource is installed is, for example, an operating system in which application software is installed.

And, the policy update apparatus 100 specifies the software policy which is correlated to the resource identifier and the install destination resource identifier. And, the policy update apparatus 100 updates the specified software policy. The policy update apparatus 100 correlates the updated software policy to the above-mentioned resource identifier and install destination resource identifier, and stores.

In other words, when at least a part of the configuration of the system has changed, the policy update apparatus 100 according to the first exemplary embodiment specifies the resource identifier of the resource in which the configuration change has occurred and the install destination resource identifier. By doing that, the policy update apparatus 100 can specify the correlated software policy.

Here, the policy update apparatus 100 specifies a set of a resource and an install destination resource. By doing that, the policy update apparatus 100 can select the correct software policy, even when, for example, the setting information (software policy) is different depending on OS (Operating System) of the install destination even for the same application software.

Therefore, the policy update apparatus 100 according to the first exemplary embodiment can update the software policy appropriately corresponding to the configuration change in the resource.

Hereinafter, each component provided in the policy update apparatus 100 according to the first exemplary embodiment will be described.

===Policy Storage Unit 101===

The policy storage unit 101 stores the software policy with providing a mapping to the resource identifier and the install destination resource identifier. FIG. 2 is a figure showing an example of information which the policy storage unit 101 stores. When referring to FIG. 2, the policy storage unit 101 is storing the software policy A1, the resource identifier A2 and the install destination resource identifier A3 with providing a mapping among of them.

The software policy is the setting information to the resource. For example, ACL (Access Control List) to the resource and the environmental information to the resource, or the like are mentioned.

FIG. 3 is a figure showing an example of the software policy. For example, the software policy shown in FIG. 3 includes the following information.

'version 3.0;
acl "default;.
Authenticate (user, group) {prompt="XXX Web Server";
};
Allow (read, execute, info) user="anyone";
Allow (list, write, delete) user="all";
acl "es-internal";
Allow (read, execute, info) user="anyone";
Deny (list, write, delete) user="anyone";"

Further, the software policy A1 of FIG. 2 is, for example, a reference address for storing the software policy, or a file name.

The resource includes various resources for operating a computer. For example, such resources can be mentioned as VM(Virtual Machine), OS(Operating System), middleware, a reference monitor. The reference monitor is the software which monitors access to a specific resource and performs access control.

The resource identifier is an identifier for identifying the resource. The install destination resource identifier is an identifier for identifying an install destination resource in which a corresponding resource is installed. The corresponding resource is the resource identified by the resource identifier which is corresponding to the install destination resource identifier.

===Policy Retrieving Unit 102===

The policy retrieving unit 102 receives the resource identifier, and reads out the install destination resource identifier which is correlated to the resource identifier from a resource management unit which will be mentioned later. And, the policy retrieving unit 102 reads out the software policy which is correlated to the read out install destination resource identifier and the received resource identifier from the policy storage unit 101.

The policy retrieving unit 102 may receive the resource identifier from an external apparatus which is not illustrated. Or, a manager of the policy update apparatus 100 may input the resource identifier. This resource identifier is an identifier which indicates the software which changes the software policy.

The resource management unit stores the resource identifier and the install destination resource identifier which indicates the install destination resource in which the resource identified by the resource identifier is installed with providing a mapping between of them.

Figure 4:
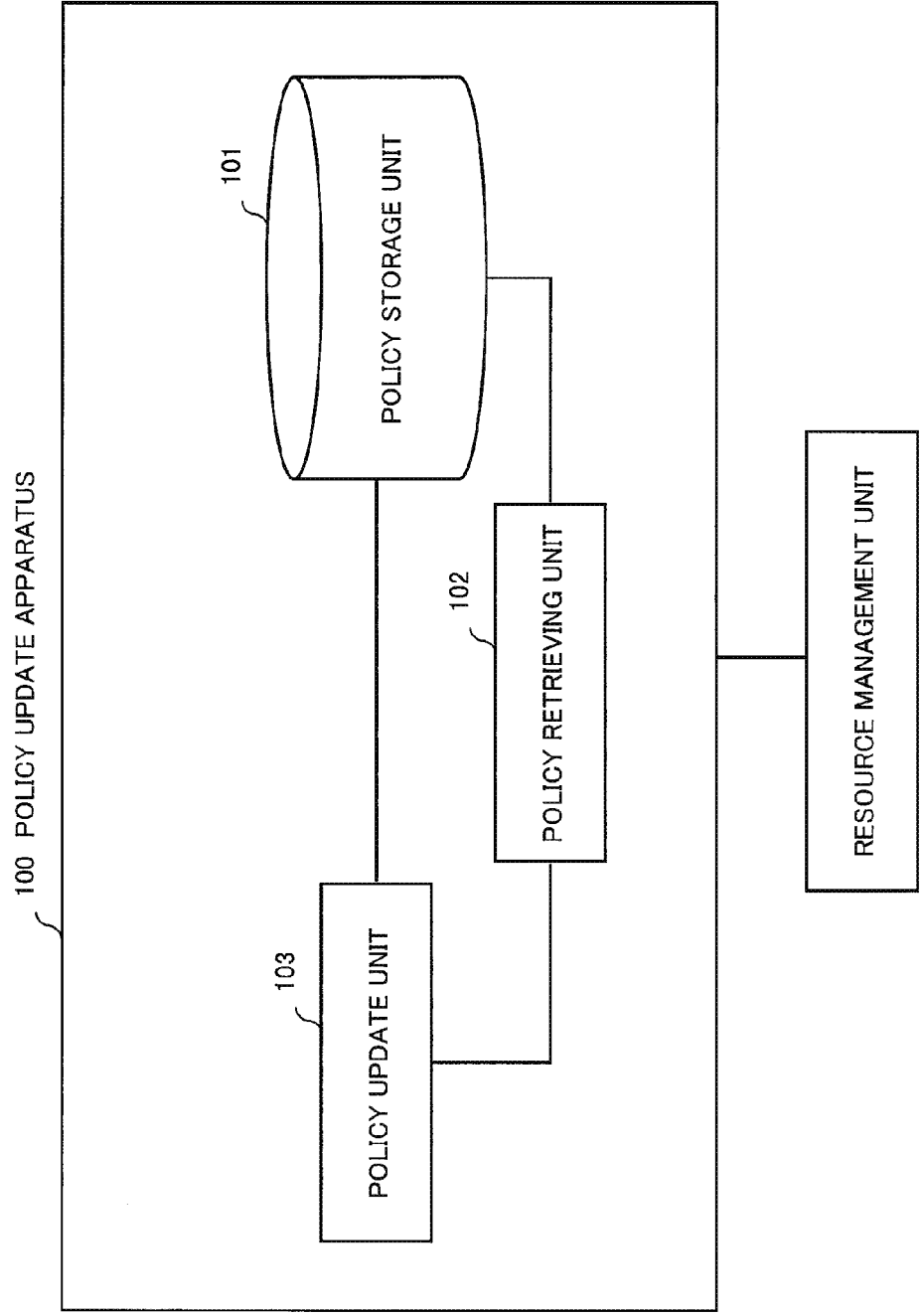
FIG. 4 is a block diagram showing another example of the configuration of the policy update apparatus according to the first exemplary embodiment.

For example, the resource management unit may be connected to the policy update apparatus 100 as shown in FIG. 4.

===Policy Update Unit 103===

The policy update unit 103 updates the software policy which the policy retrieving unit 102 has read out. And, the policy update unit 103 makes a correlation among this software policy, the resource identifier and the install destination resource identifier, and stores to the policy storage unit 101. This resource identifier is the resource identifier which the policy retrieving unit 102 has received. Further, this install destination resource identifier is the install destination resource identifier which the policy retrieving unit 102 has read out from the resource management unit.

Figure 5:
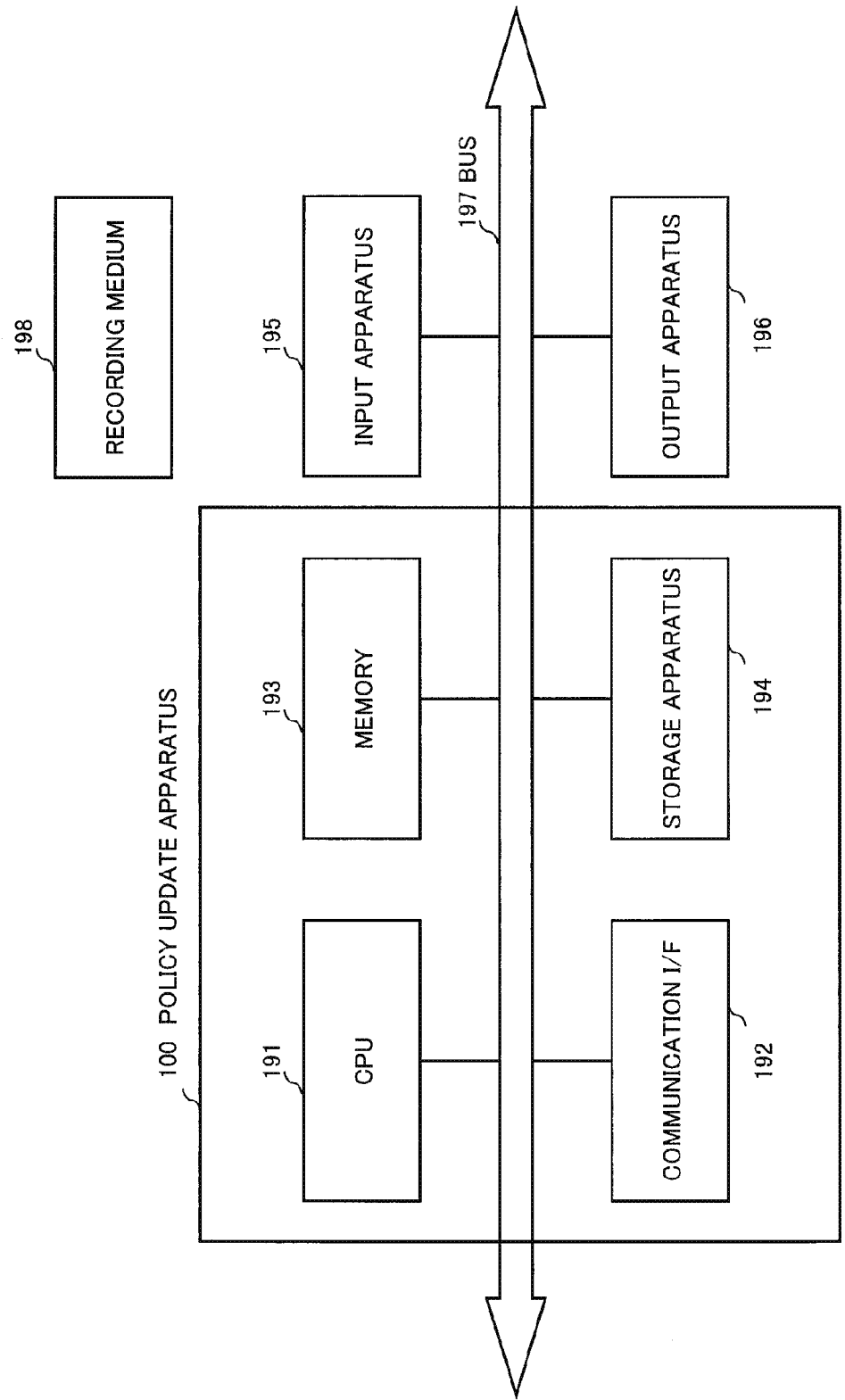
FIG. 5 is a figure showing a hardware configuration of the policy update apparatus and its peripheral equipment according to the first exemplary embodiment.

FIG. 5 is a figure showing a hardware configuration of the policy update apparatus 100 according to the first exemplary embodiment of the present invention and its peripheral equipment. As shown in FIG. 5, the policy update apparatus 100 includes a CPU 191 (Central Processing Unit), a communication I/F 192 (a communication interface 192) for network connections, a memory 193 and a storage apparatus 194 such as a hard disk for storing a program. Also, the policy update apparatus 100 is connected to an input apparatus 195 and an output apparatus 196 via a bus 197.

The CPU 191 operates the operating system and controls the whole of the policy update apparatus 100 according to the first exemplary embodiment of the present invention. Further, the CPU 191 reads out a program and data, for example, from a recording medium 198 equipped on a drive apparatus or the like to the memory 193. And, the CPU 191 executes various processing as the policy storage unit 101, the policy retrieving unit 102 and the policy update unit 103 in the first exemplary embodiment according to the program and data which have been read out.

The storage apparatus 194 is, for example, an optical disc, a flexible disc, a magnetic optical disc, an external hard disk or a semiconductor memory or the like, and records a computer program so that it is computer-readable. Further, the computer program may be downloaded from an outside computer, which is not illustrated, connected to a communication network.

The policy storage unit 101 may be realized by the storage apparatus 194.

The input apparatus 195 is realized, for example, by a mouse, a keyboard, a built-in key button or the like, and used for input operation. The input apparatus 195 is not limited to a mouse, a keyboard, a built-in key button, it may be, for example, a touch panel, an accelerometer, a gyro sensor, a camera, or the like.

The output apparatus 196 is realized, for example, by a display, and used for confirming an output.

Further, in the block diagram (FIG. 1) used for a description of the first exemplary embodiment, blocks of the function units, not a configuration of the hardware units, are shown. These function blocks are realized by a hardware configuration shown in FIG. 5. However, realization means of each part provided in the policy update apparatus 100 is not limited in particular. That is, the policy update apparatus 100 may be realized by physically combined one apparatus, or may be realized by a plurality of apparatuses which are formed by physically separated two or more apparatuses being connected by a wire or wireless.

Further, the CPU 191 may read in the computer program recorded on the storage apparatus 194 and operate as the policy storage unit 101, the policy retrieving unit 102 and the policy update unit 103 according to the program.

Further, the recording medium (or storage medium) in which codes of the above-mentioned program are recorded is supplied to the policy update apparatus 100, and the policy update apparatus 100 may read out and execute the codes of the program stored in the recording medium. That is, the present invention includes the recording medium 198 which temporarily or non-temporarily stores the software (information processing program) to be executed by the policy update apparatus 100 according to the first exemplary embodiment.

Figure 6:
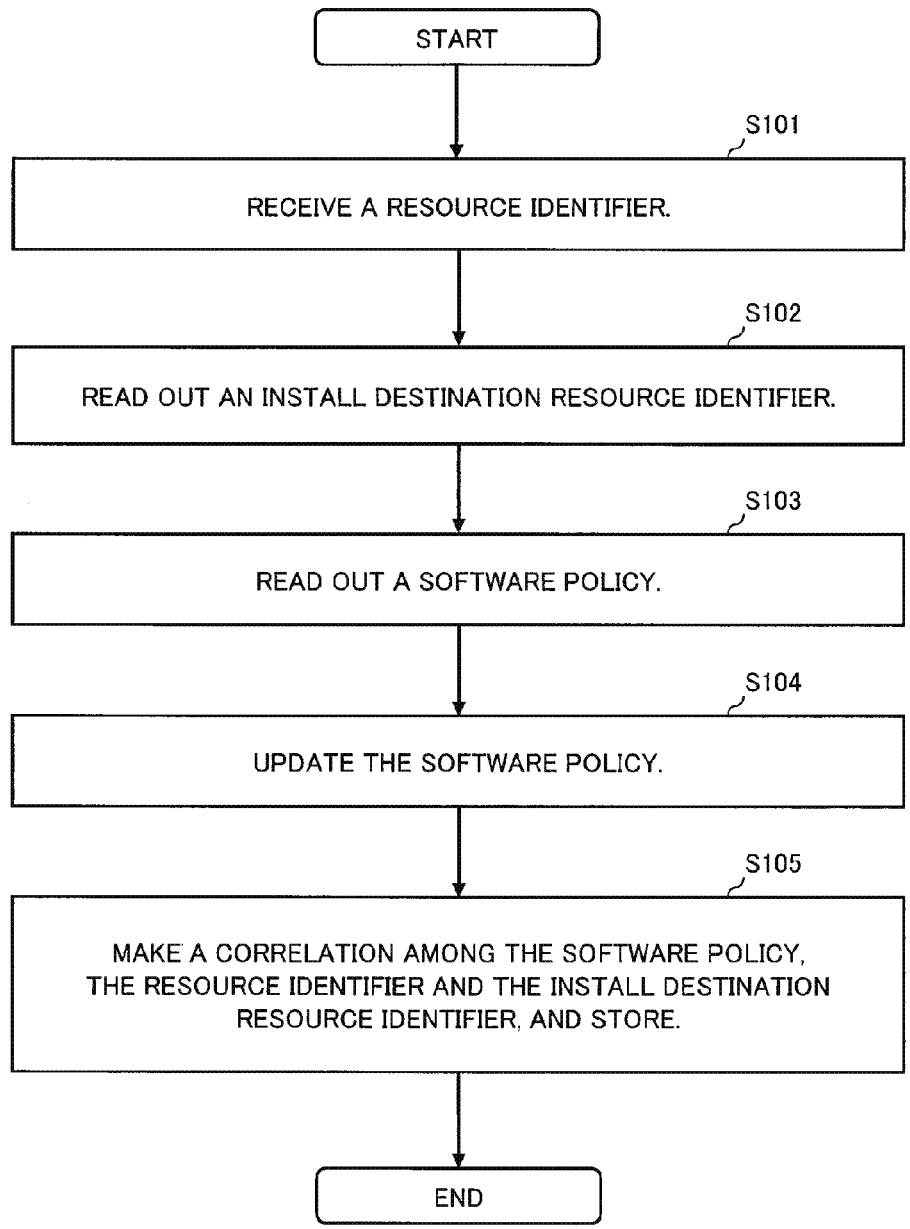
FIG. 6 is a flowchart showing the outline of operation of the policy update apparatus according to the first exemplary embodiment.

FIG. 6 is a flowchart showing the outline of operation of the policy update apparatus 100 according to the first exemplary embodiment.

The policy retrieving unit 102 receives a resource identifier from the resource management unit (Step S101).

Next, the policy retrieving unit 102 reads out an install destination resource identifier which is correlated to the resource identifier received in Step S101 (Step S102).

Next, the policy retrieving unit 102 reads out a software policy which is correlated to the resource identifier received in Step S101 and the install destination resource identifier read out in Step S102 from the policy storage unit 101 (Step S103).

Next, the policy update unit 103 updates the software policy which the policy retrieving unit 102 has read out (Step S104).

Next, the policy update unit 103 makes a correlation among the resource identifier, the install destination resource identifier and the software policy, and stores to the policy storage unit 101 (Step S105).

In Step S105, the resource identifier is the resource identifier which the policy retrieving unit 102 has received in Step S101. The install destination resource identifier is the install destination resource identifier which the policy retrieving unit 102 has read out in Step S102. In Step S104, the software policy is the software policy which the policy update unit 103 has updated.

The policy update apparatus 100 according to the first exemplary embodiment, when it receives the resource identifier which indicates the resource, specifies the resource identifier and the install destination resource identifier which indicates the install destination resource in which the resource is installed. And, the policy update apparatus 100 specifies the software policy which is correlated to the resource identifier and the install destination resource identifier. Then, the policy update apparatus 100 updates the specified software policy, correlates the updated software policy to the above-mentioned resource identifier and install destination resource identifier and memorizes.

In other words, the policy update apparatus 100 according to the first exemplary embodiment, even when at least a part of the configuration of the system changes, can appropriately specify the software policy which is correlated to the resource identifier and the install destination resource identifier which are corresponding to the change. Therefore, the policy update apparatus 100 according to the first exemplary embodiment can update the software policy appropriately corresponding to the configuration change in the resource.

In the Cloud Computing environment, the configuration of the system is changed by Migration and Scale Out or the like. Accordingly, in such environment, there is the possibility that the system may not operate correctly even if the software policy is delivered in a lump to each of servers or the like which compose the system.

For example, when a virtual server is added, a system manager needs to set a software policy by using a special privilege account in order to operate OS and middleware in the virtual server. This setting work is the setting which depends on the environment according to the OS or the middleware (a hardware network configuration in which the virtual server is arranged, manager authority, or the like). Accordingly, the system manager has to correct a part of the software policy by manual procedures.

In the cloud environment, the system manager needs to perform individual setting respectively according to the different kind middleware or OS. However, when the system is large in scale, it increases in workloads for doing the setting, and the possibility that correct setting is not performed caused by incomplete correction or the like produced by the manual procedures will occur.

In the policy update apparatus 100 according to the first exemplary embodiment, when updating the software policy, the software policy corresponding to the configuration of the resource having been changed is read out. That is, when the virtual server is added and the middleware is to be initialized, the policy update apparatus 100 designates the resource identifier of the middleware required to be initialized.

In the cloud environment, when the kind of OS is one in the destination where the middleware is installed, the corresponding software policy is specified immediately. When there are plural kinds of OS in the install destination, a plurality of software policies are retrieved. In this case, the manger may select the software policy corresponding to the OS of the middleware to be initialized.

Further, with respect to identification of software resources, when the version is different even in the same software, each of the resource identifiers may be different. In this case, the trouble that the same setting is applied to the different version software is avoided.

Also, with respect to initialization of OS, the software policy of the OS is correlated to a set of the identifier of the OS and the virtual server (VM) identifier in the install destination. By this thing, the policy update apparatus 100 can update the software policy which is suitable for the environment of the install destination.

The system manager, like this, can reduce the possibility of incomplete correction when performing individual setting respectively according to the different kind middleware or OS.

Also, with respect to setting of the virtual server (VM), a configuration file of the virtual server is correlated to a set of the identifier of the virtual server and the identifier of a physical server in the install destination, and the software policy of the virtual server may be correlated to those. Further, for example, the software policy of the virtual server includes the environment setting of storage or I/O, DOM0 operation privilege of the manager, or the like. DOM indicates Document Object Model.

Accordingly, the policy update apparatus 100 according to the first exemplary embodiment can update the software policy appropriately corresponding to the configuration change in the resource.

Second Exemplary Embodiment

In the first exemplary embodiment, the policy storage unit 101 may store the resource identifier, a software identifier which is the identifier for identifying the corresponding software and the software policy with providing a mapping among of them. Here, the corresponding software is the software which is applied to the resource identified by the resource identifier.

FIG. 7 is a figure showing an example of information which the policy storage unit 101 according to a second embodiment stores. When referring to FIG. 7, the policy storage unit 101 is storing the software policy B1, the resource identifier B2, the software identifier B3 and the install destination resource identifier B4 with providing a mapping among of them.

In the second exemplary embodiment, the policy retrieving unit 102 may operate as follows. That is, the policy retrieving unit 102 may perform the following processing of Step S101-2 and Step S103-2 instead of the processing of Step S101 and Step S103 of the operation of the policy update apparatus 100 according to the first exemplary embodiment.

The policy retrieving unit 102 receives a resource identifier and a software identifier from the resource management unit (step S101-2).

Next, the policy retrieving unit 102 reads out an install destination resource identifier which is correlated to the received resource identifier (Step S102).

Next, the policy retrieving unit 102 reads out a software policy, which is correlated to the received resource identifier and software identifier and the read out install destination resource identifier, from the policy storage unit 101 (step S103-2).

The policy update apparatus 100 according to the second exemplary embodiment stores the software policy for each software applied to the resource. Accordingly, even if the software applied to the resource has changed, the policy update apparatus 100 can specify the software policy corresponding to the change and update the specified software policy. That is, the policy update apparatus 100 according to the second exemplary embodiment can update the software policy appropriately corresponding to the change in the software applied to the resource.

Further, in the second exemplary embodiment, when the version is different even in the same software, each of the software identifiers is different. Accordingly, the same resource identifier may be correlated to the different version software.

First Modification of Second Exemplary Embodiment

In the second embodiment, the policy update apparatus 100, instead of receiving a software identifier, may receive the software identifier from the resource management unit. In this case, the resource management unit stores from the resource identifier and the software identifier to the install destination resource identifier with providing a mapping of them. Further, the software identifier is the software identifier which indicates the software which is applied to the resource identified by the resource identifier. Also, the install destination resource identifier is the install destination resource identifier which indicates the install destination resource in which the resource identified by the resource identifier is installed.

In the first modification of the second exemplary embodiment, the policy retrieving unit 102 may operate as follows. That is, the policy retrieving unit 102 may perform the following processing of Step S101-2 and Step S103-3 instead of the processing of Step S102 and Step S103 of the operation of the policy update apparatus 100 according to the first exemplary embodiment.

The policy retrieving unit 102 receives a resource identifier from the resource management unit (Step S101).

Then, the policy retrieving unit 102 reads out a software identifier and an install destination resource identifier which are correlated to the received resource identifier (step S102-2).

Next, the policy retrieving unit 102 reads out a software policy which is correlated to the received resource identifier and the read out software identifier and install destination resource identifier from the policy storage unit 101 (step S103-3).

The policy update apparatus 100 according to the first modification of the second exemplary embodiment takes the same effect as the policy update apparatus 100 according to the second exemplary embodiment.

Third Exemplary Embodiment

In the second exemplary embodiment, the policy storage unit 101 may store from the software policy as a default policy to the software identifier with providing a mapping of them.

FIG. 8 is a figure showing an example of information which the policy storage unit 101 according to a third exemplary embodiment stores. When referring to FIG. 8, the policy storage unit 101 is storing from the software policy C1 to the software identifier C2 with providing a mapping of them.

Figure 9:
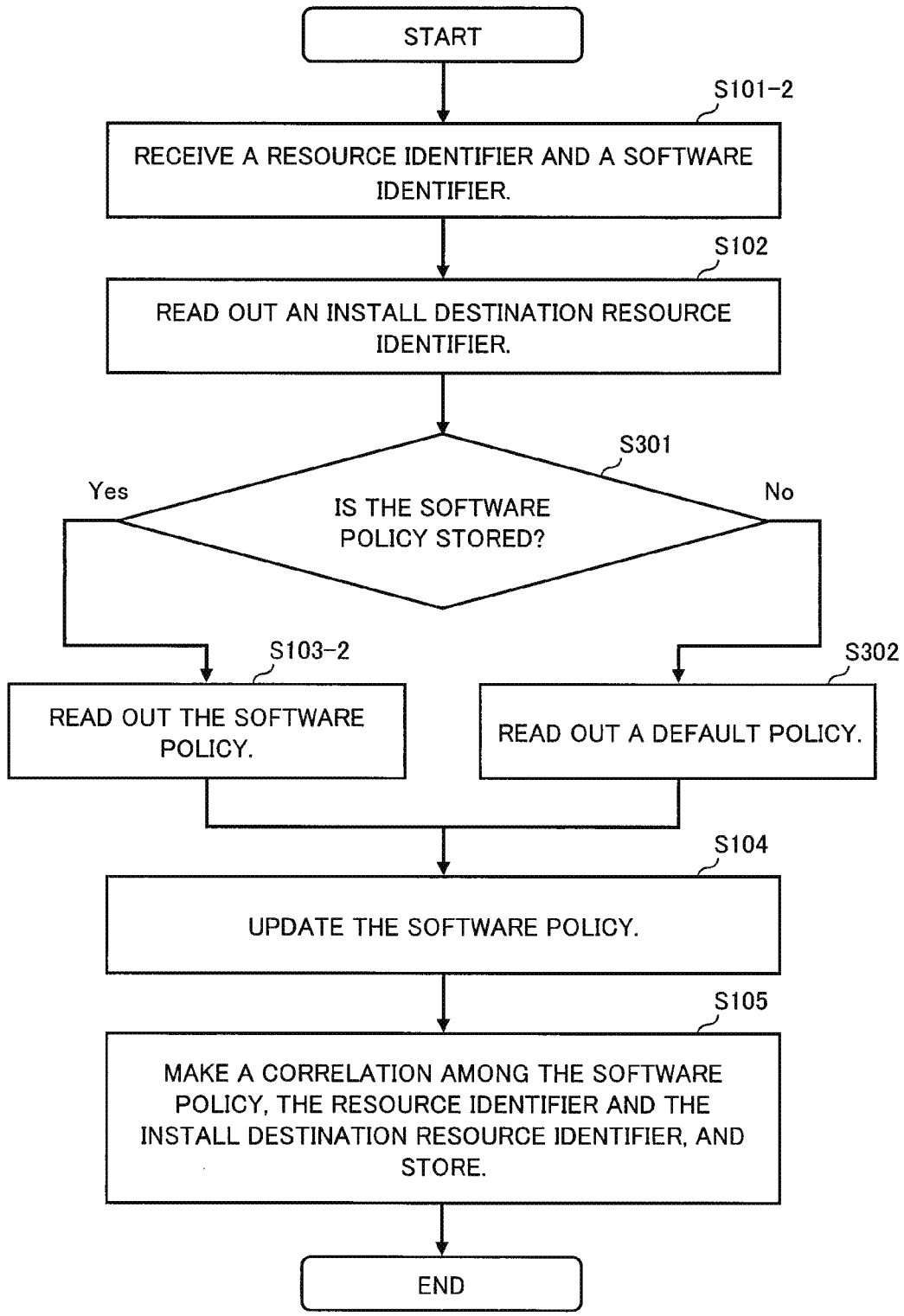
FIG. 9 is a flowchart showing the outline of operation of the policy update apparatus according to the third exemplary embodiment.

FIG. 9 is a flowchart showing the outline of operation of the policy update apparatus 100 according to the third exemplary embodiment.

The policy retrieving unit 102 receives a resource identifier and a software identifier from the resource management unit (step S101-2).

And, the policy retrieving unit 102 reads out an install destination resource identifier which is correlated to the resource identifier received in step S101-2 (Step S102).

The policy retrieving unit 102 determines whether or not the software policy which is correlated to the resource identifier and the install destination resource identifier is stored in the policy storage unit 101 (Step S301). Further, the resource identifier is the resource identifier received in step S101-2. The install destination resource identifier is the install destination resource identifier read out in Step S102.

The policy retrieving unit 102 reads out a relevant software policy from the policy storage unit 101 when the relevant software policy is stored in the policy storage unit 101 ("Yes" of Step S301) (step S103-2). Further, the relevant software policy is the software policy which is correlated to the resource identifier and the software identifier received in Step S101 and the install destination resource identifier read out in Step S102. Then, the operation of the policy update apparatus 100 advances towards Step S104.

On the other hand, the policy retrieving unit 102 reads out a default policy when the relevant software policy is not stored in the policy storage unit 101 ("No" of Step S301) (Step S302). Further, the default policy is the default policy which is correlated to the software identifier received in step S101-2. Then, the operation of the policy update apparatus 100 advances towards Step S104.

The policy update unit 103 updates the software policy which the policy retrieving unit 102 has read out (Step S104).

Next, the policy update unit 103 makes a correlation among the resource identifier, the install destination resource identifier and the software policy, and stores to the policy storage unit 101 (Step S105).

Further, in Step S105, the resource identifier is the resource identifier which the policy retrieving unit 102 has received in Step S101-2. Also, the install destination resource identifier is the install destination resource identifier which the policy retrieving unit 102 has read out in Step S102. Further, the software policy is the software policy which the policy update unit 103 has updated in Step S104.

The policy update apparatus 100 according to the third exemplary embodiment reads out the default software policy (which is not customized) even when the previous software policy has not conformed to the configuration of the present resource any more. For example, by the configuration change in the resource such as upgrading of OS version, installing new middleware, the previous software policy has become out of conforming to the configuration of the present resource any more. Therefore, the policy update apparatus 100 according to the third exemplary embodiment can update the software policy appropriately corresponding to the configuration change in the resource.

Fourth Exemplary Embodiment

Figure 10:
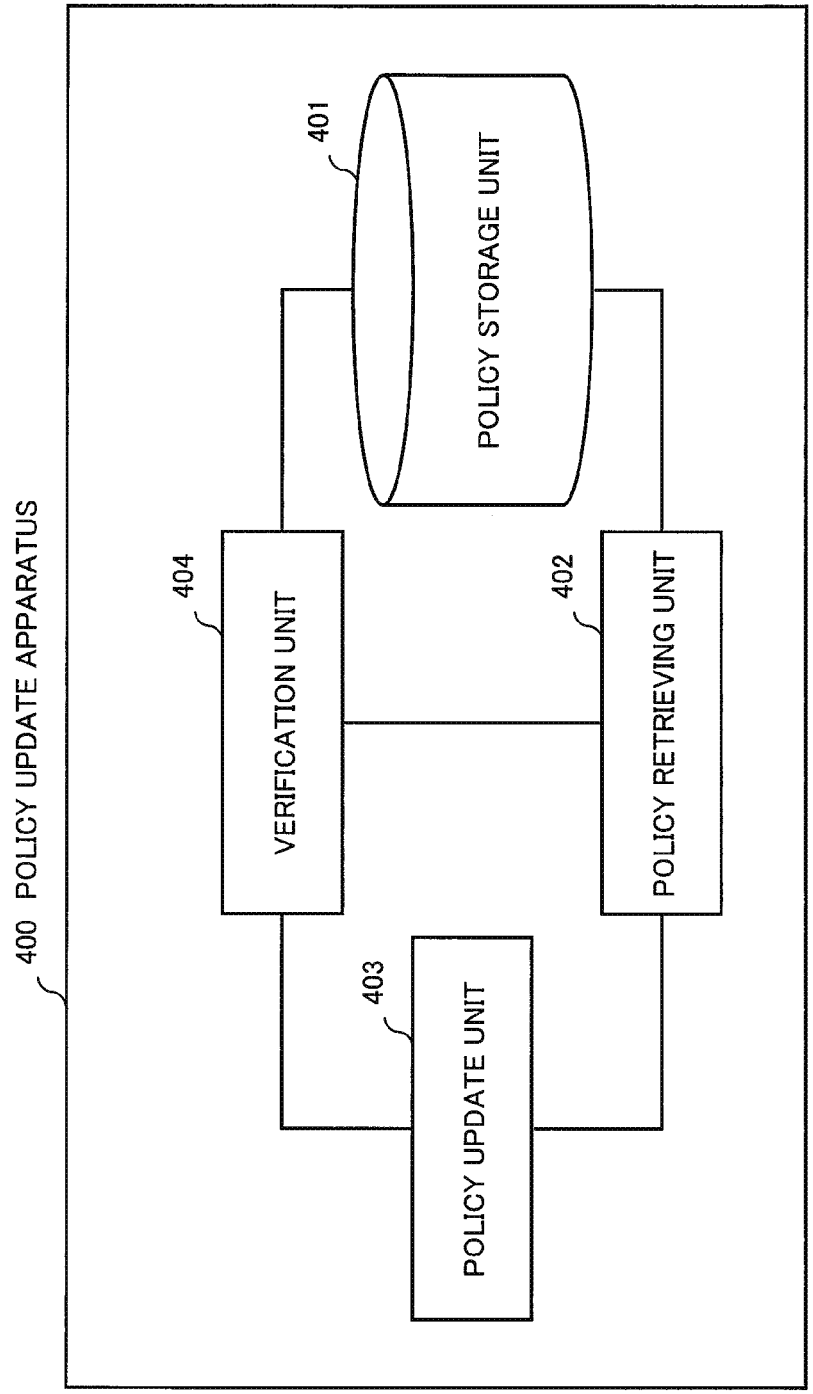
FIG. 10 is a block diagram showing a configuration of a policy update apparatus according to a fourth exemplary embodiment.

FIG. 10 is a block diagram showing a configuration of a policy update apparatus 400 according to a fourth exemplary embodiment. When referring to FIG. 10, the policy update apparatus 400 includes a policy storage unit 401, a policy retrieving unit 402, a policy update unit 403 and a verification unit 404.

===Policy Storage Unit 401===

The policy storage unit 401 stores the resource identifier, the install destination resource identifier, the software policy and an update history of the software policy with providing a mapping among of them. FIG. 11 is a figure showing an example of information which the policy storage unit 401 stores. When referring to FIG. 11, the policy storage unit 401 is storing the software policy D1, the resource identifier D2, the install destination resource identifier D3 and the update history D4 of the software policy with providing a mapping among of them.

===Policy Retrieving Unit 402===

The policy retrieving unit 402 has at least the same function as the policy retrieving unit 102 in the first exemplary embodiment to the third exemplary embodiment.

Further, the policy retrieving unit 402 passes the update history which is correlated to the software policy read out from the policy storage unit 401 to the policy update unit 403 and the verification unit 404 which will be mentioned later.

===policy update unit 403===

Figure 12:
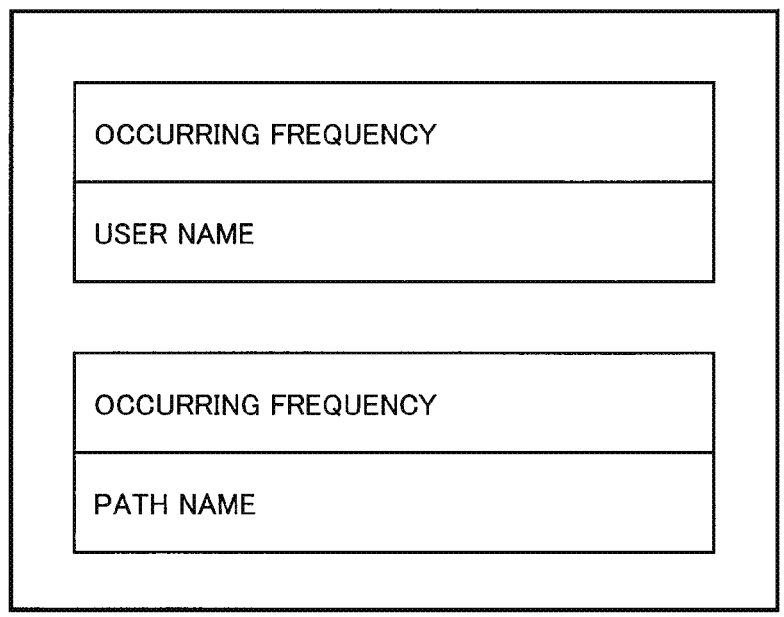
FIG. 12 is a figure showing an example of information which a policy update unit outputs.
Figure 13:
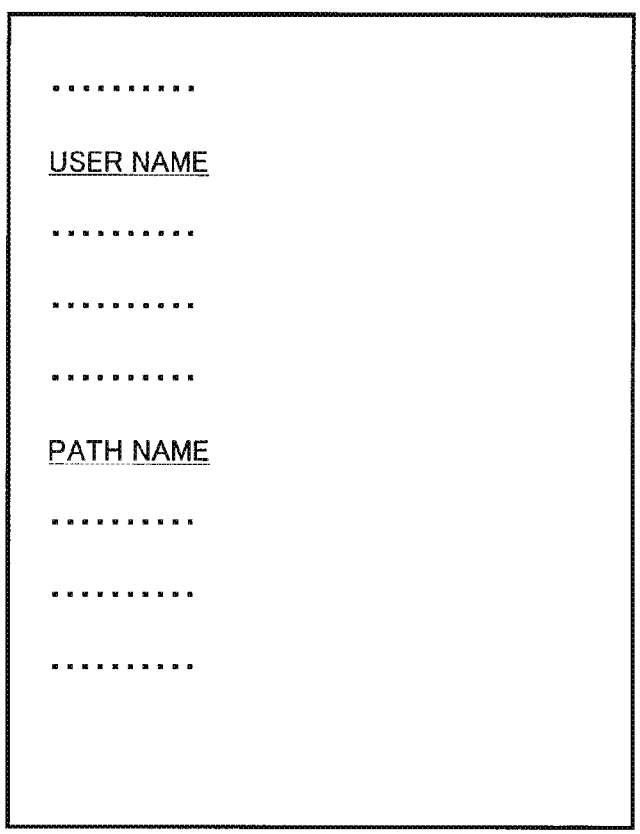
FIG. 13 is a figure showing an example of information which the policy update unit outputs.

The policy update unit 403 updates the software policy which the policy retrieving unit 402 has read out. On this occasion, the policy update unit 403 makes a correlation between the software policy which the policy retrieving unit 402 has read out and the update history which is received from the policy retrieving unit 402, and outputs. FIG. 12 and FIG. 13 are figures showing examples of information which the policy update unit 403 outputs.

As shown in FIG. 12, the policy update unit 403 may output the information on a part (difference) where the software policy has been changed which is indicated by the update history. For example, when the information which shows that a user name has been changed to "aaaa@localhost", a path name has been changed to "/home/*/public_html" is included as the update history, as shown in FIG. 12, it may output the information which shows that the user name and the path name have been previously changed.

As shown in FIG. 12, the policy update unit 403 may output together with the information which indicates an occurring frequency of the changed part (for example, "a user name (updated twice)", "a path name (updated 4 times)) indicated by the update history. Also, the policy update unit 403 may output not only the latest update result but also the update history of the past.

As shown in FIG. 13, the policy update unit 403 may output the software policy and the update history all together which the policy retrieving unit 402 has read out. When referring to FIG. 13, the portion indicated by an underline is the information on the part (difference) where the software policy has been changed, which is indicated by its update history.

The policy update unit 403 receives, based on its outputted information, an input of the information which indicates the update processing of the software policy. And, the policy update unit 403 passes the software policy which has been updated based on the information which indicates the update processing to the verification unit 404 which will be mentioned later.

===Verification Unit 404===

The verification unit 404 receives the update history from the policy retrieving unit 402. Also, the verification unit 404 receives the updated software policy from the policy update unit 403. Then, the verification unit 404 verifies, based on the coincidence of the software policy and its update history, whether or not update of the received software policy is correct.

The verification unit 404 may verify whether or not the software policy is correct, based on, for example, whether or not the updated portion indicated by the update history overlaps at least partially with the updated portion of the received software policy, or whether or not coincides with. For example, when a portion which is not updated in the past is updated this time, the verification unit 404 may determine that there is a possibility of not correct, and out put information via the policy update apparatus to prompt reconfirmation of the relevant portion.

Further, the verification unit 404 may verify whether or not the software policy is correct, based on whether or not a past user name indicated by the update history coincides with the user name included in the received software policy.

Here, when the past user name indicated by the update history does not coincide with the user name included in the received software policy, the verification unit 404 may inquire for user's authority at a server or the like which manages the user's authority. Further, the user's authority is authority identified by the user name included in the software policy. And, the verification unit 404 may verify whether or not the software policy is correct based on the authority held by the user. For example, when the user holds a management role, it may be verified that the software policy is correct.

The verification unit 404 makes a correlation among the software policy verified as being correct, the update history to which newly updated difference information is added, the resource identifier and the install destination resource identifier, and stores to the policy storage unit 401. This resource identifier is the resource identifier which the policy retrieving unit 402 has received. Also, this install destination resource identifier is the install destination resource identifier which the policy retrieving unit 402 has read out from the resource management unit.

Figure 14:
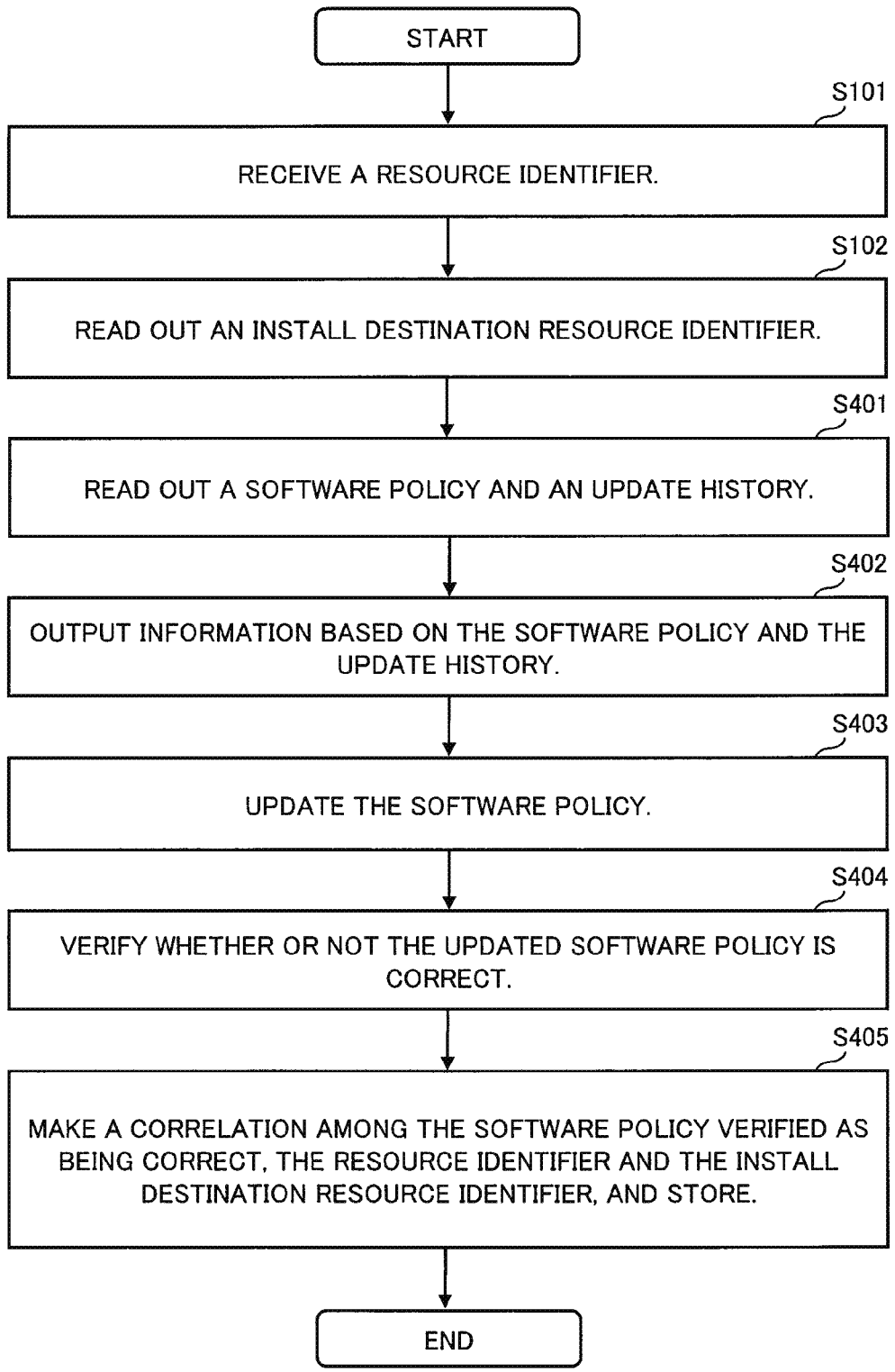
FIG. 14 is a flowchart showing the outline of operation of the policy update apparatus according to the fourth exemplary embodiment.

FIG. 14 is a flowchart showing the outline of operation of the policy update apparatus 400 according to the fourth exemplary embodiment.

The policy retrieving unit 402 receives a resource identifier from the resource management unit (Step S101).

Next, the policy retrieving unit 402 reads out an install destination resource identifier which is correlated to the resource identifier received in Step S101 (Step S102).

Next, the policy retrieving unit 402 reads out a software policy and an update history which are correlated to the resource identifier and the install destination resource identifier from the policy storage unit 401 (Step S401). Further, the resource identifier is the resource identifier received in Step S101. Also, the install destination resource identifier is the install destination resource identifier read out in its Step S102. The policy retrieving unit 402 passes the read out update history to the policy update unit 403 and the verification unit 404.

Next, the policy update unit 403 outputs information based on the software policy and the update history which the policy retrieving unit 402 has read out (Step S402).

Next, the policy update unit 403 updates the software policy based on the information which is inputted based on the outputted information and indicates the update processing of the software policy (Step S403). And, the policy update unit 403 passes the updated software policy and the information on the newly updated portion (difference information) to the verification unit 404.

Next, the verification unit 404 verifies whether or not the software policy is correct based on the coincidence of the software policy received from the policy update unit 403 and the update history received from the policy retrieving unit 402 (Step S404).

Then, the verification unit 404 makes a correlation among the software policy verified as being correct, the update history to which newly updated information is added, the resource identifier and the install destination resource identifier, and stores (Step S405).

In step S405, the resource identifier is the resource identifier which the policy retrieving unit 402 has received in Step S101. Also, the install destination resource identifier is the install destination resource identifier which the policy retrieving unit 402 has read out in Step S102.

The policy update apparatus 400 according to the fourth exemplary embodiment stores the software policy which is verified as being correct by the verification unit 404. Accordingly, at the time of software policy update, the correct software policy corresponding to the configuration of the changed resource is read out. The system manager performs update work based on the software policy. Therefore, the possibility of incomplete correction when the system manager performs individual setting respectively according to the different kind middleware or OS can be reduced.

Therefore, the policy update apparatus 400 according to the fourth exemplary embodiment can update the software policy appropriately corresponding to the configuration change in the resource.

First Modification of Fourth Exemplary Embodiment

In the fourth exemplary embodiment, the verification unit 404 may verify whether or not the software policy is correct based on a verification rule received from the policy retrieving unit 402. In this case, the policy retrieving unit 402 passes the verification rule to the verification unit 404. Further, the verification rule is the verification rule which is specified based on at least either the software policy read out from the policy storage unit 401, or the resource identifier or install destination resource identifier correlated to the software policy.

The verification rule may be a syntactic regulation of the software policy. Or, the verification rule may be a user name as a manager which is capable of being written on the software policy or a path name which is capable of being written on the software policy. Or, the verification rule may be information which indicates the range of the value set by the software policy. For example, this information may be the resource amount (disk capacity, memory usage or the like) required for software operation. This resource amount may be the value determined by SLA (Service Level Agreement) included in the software utilization condition of the cloud computing.

The policy update apparatus 400 according to the first modification of the fourth exemplary embodiment takes the same effect as the policy update apparatus according to the fourth exemplary embodiment.

Fifth Exemplary Embodiment

Figure 15:
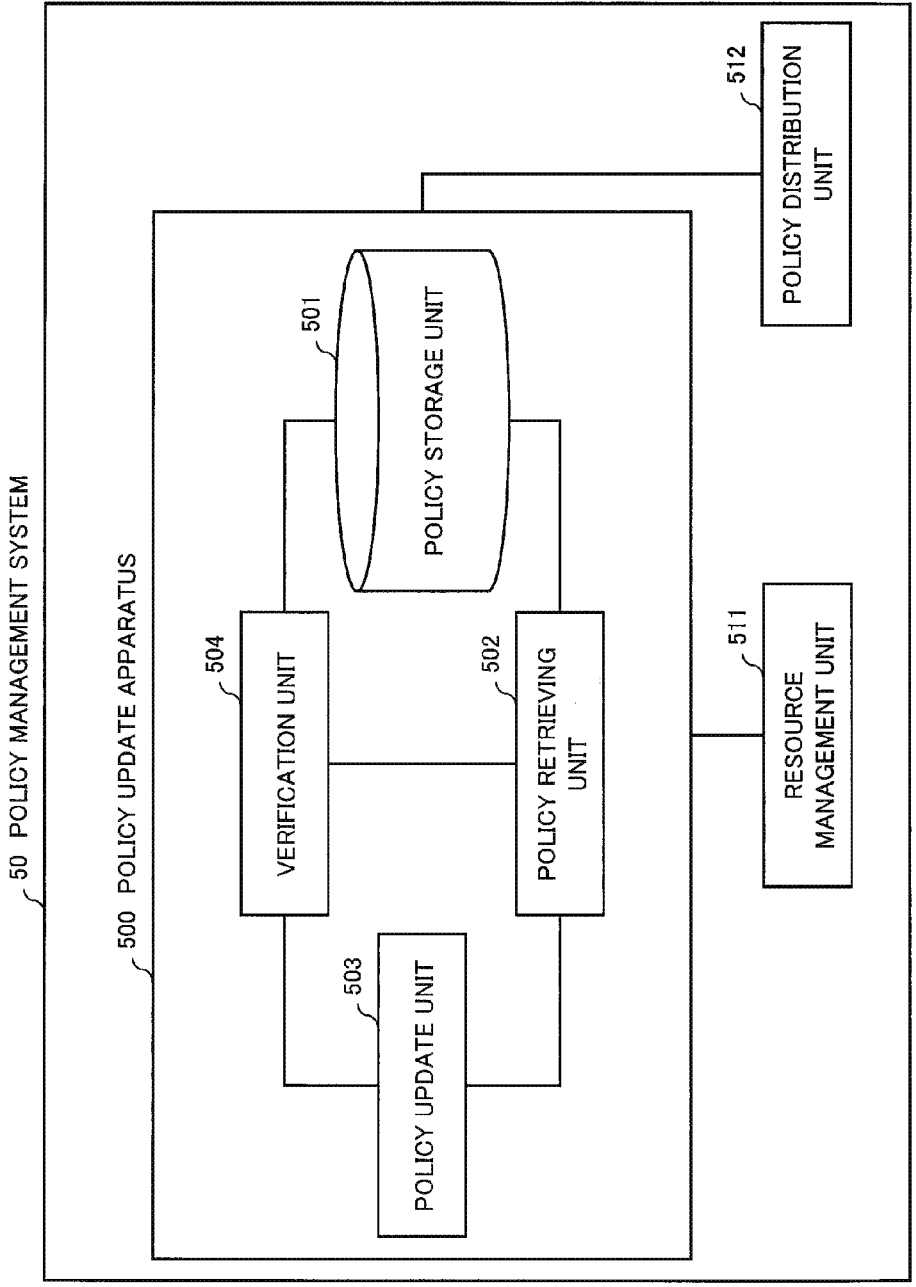
FIG. 15 is a block diagram showing a configuration of a policy management system according to a fifth exemplary embodiment.

FIG. 15 is a block diagram showing a configuration of a policy management system 50 according to a fifth exemplary embodiment. When referring to FIG. 15, the policy management system 50 according to the fifth exemplary embodiment includes a policy update apparatus 500, a resource management unit 511 and a policy distribution unit 512.

By introducing a concept of a cluster, the policy management system 50 according to the fifth exemplary embodiment can set the software policy in a lump to a resource group in which virtual servers having the same software structure are clustered. That is, the policy management system 50 can easily change the setting of an individual computer according to the increase and decrease of computers composing the system, which occurs in the cloud environment.

Hereinafter, each component provided in the policy management system 50 according to the fifth exemplary embodiment will be described.

<Policy Update Apparatus 500>

The policy update apparatus 500 includes a policy storage unit 501, a policy retrieving unit 502, a policy update unit 503 and a verification unit 504.

===Policy Storage Unit 501===

The policy storage unit 501 is storing a cluster policy, a resource identifier, an install destination resource identifier, a cluster group identifier and an in-cluster server identifier with providing a mapping among of them. FIG. 16 is a figure showing an example of information which the policy storage unit 501 stores. When referring to FIG. 16, the policy storage unit 501 is storing the cluster policy E1, the resource identifier E2, the install destination resource identifier E3, the cluster group identifier E4 and the in-cluster server identifier E5 with providing a mapping among of them.

The cluster policy is the setting information to a computer belonging to the cluster. Because there is commonality in the configuration of hardware and software and the form of the change for the virtual servers which compose a cluster, the setting information and an update position of the software in the server are also very alike. Accordingly, it is supposed that the cluster policy includes the environmental information (common setting) which is common to the virtual servers in the cluster and the environmental information (individual setting) which is peculiar to each of the virtual servers. For example, when a virtual server cluster including a similar operating system, a similar database is supposed, a configuration of the cluster policy including, for example, the information on the following items is conceivable.

<Cluster Policy>

* Common setting (manager user name, storage path name or the like), for example, "aaaa@localhost/usr/local/xxxx/conf"

* Individual setting (IP (Internet Protocol) address or the like), for example,

"192.168.10.10", "1921.168.10.25", "192.168.10.100"

* A list of software policy identifiers of in-cluster OS, for example,

"OSXX1config1,OSXX1config2"

* A list of software policy identifiers of in-cluster DB, for example,

"DBXX1config1, DBxx1config2"

The software policy identifier is the identifier of the software policy corresponding to in-cluster OS and DB respectively.

Figure 17:
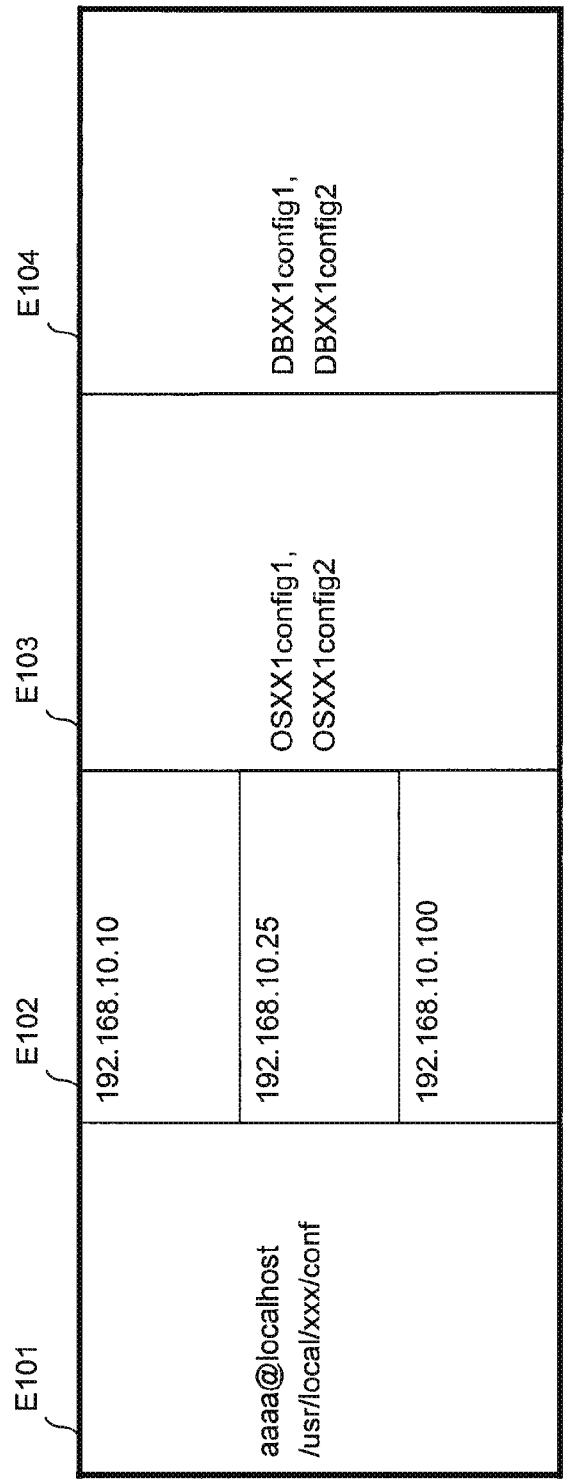
FIG. 17 is a figure showing an example of a cluster policy.

FIG. 17 is a figure showing an example of a cluster policy. When referring to FIG. 17, the cluster policy includes the common setting E101, the individual setting E102, the list of software policy identifiers of in-cluster OS E103 and the list of software policy identifiers of in-cluster DB E104.

The cluster group identifier is an identifier for identifying the cluster. The in-cluster server identifier is an identifier for identifying each of computers included in the cluster.

===Policy Retrieving Unit 502===

The policy retrieving unit 502 has the function at least similar to either the policy retrieving unit 102 or the policy retrieving unit 402 according to the first exemplary embodiment to the fourth exemplary embodiment.

Further, the policy retrieving unit 502 reads out the cluster policy, which is correlated to the install destination resource identifier which has read out from the resource management unit 511 which will be mentioned later and the received resource identifier, from the policy storage unit 501.

===Policy Update Unit 503===

The policy update unit 503 has the function at least similar to either of the policy update unit 103 or 403 in the first exemplary embodiment to the fourth exemplary embodiment.

Figure 18:
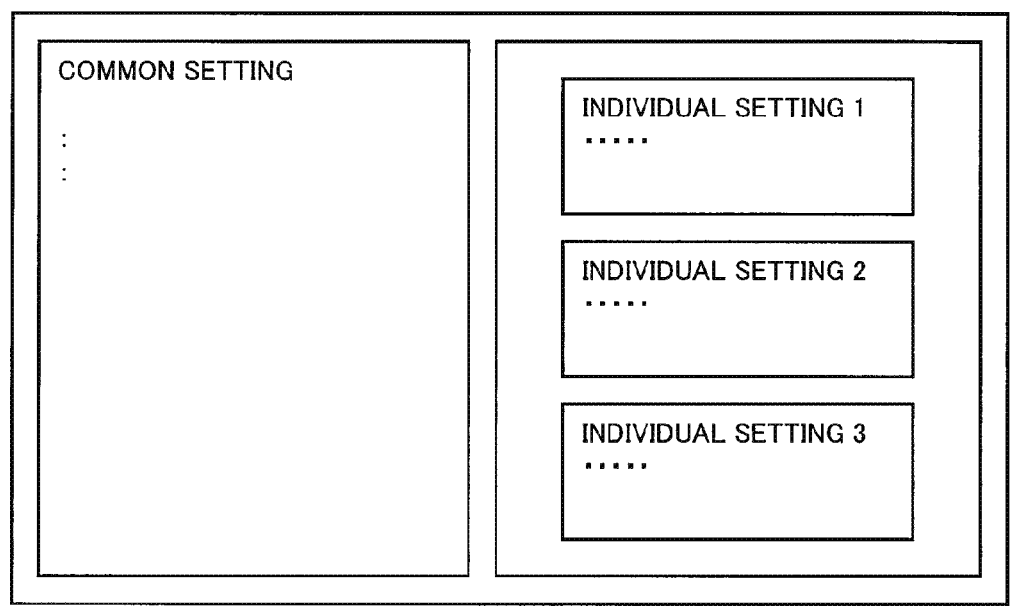
FIG. 18 is a figure showing an example of the cluster policy which the policy update unit outputs.

Further, the policy update unit 503 updates the cluster policy which the policy retrieving unit 502 has read out. On this occasion, the policy update unit 503 outputs the cluster policy which the policy retrieving unit 502 has read out. FIG. 18 is a figure showing an example of the cluster policy which the policy update unit 503 outputs. When referring to FIG. 18, the policy update unit 503 is outputting the common setting ('user name' 'path name' or the like, for example) and the individual setting (IP address or the like, for example) respectively.

The policy update unit 503 receives, based on the outputted information, an input of the information which indicates the update processing of at least any one of the software policy and the cluster policy. And, the policy update unit 503 passes at least any one of the software policy and the cluster policy, which has been updated based on the information which indicates the update processing, to the verification unit 504 which will be mentioned later.

For example, when the manager name which is the common setting information is updated, the policy update unit 503 reflects this update in all software policies in the related cluster. Further, for example, when a plurality of virtual servers are added and batch setting is performed, the policy update unit 503 may operate as follows. Here, it is supposed that the resource identifier of the additional resource already exists. That is, the policy update unit 503 adds the individual setting information corresponding to the additional resource and newly creates the software policy in which the individual setting information is overwritten with reference to the existing software policy as a model. Further, the policy update unit 503 adds the identifier (software policy identifier) of the created software policy to the cluster policy.

The cluster policy and the software policy updated as stated above are outputted to the verification unit 504.

===Verification Unit 504===

The verification unit 504 has the function at least similar to either the verification unit 404 according to the fourth exemplary embodiment or the first modification of the fourth exemplary embodiment.

The verification unit 504 may verify the cluster policy by the method similar to the verification of software policy.

===Resource Management Unit 511===

The resource management unit 511 stores the resource group identifier which is correlated to a plurality of resource identifiers, those pluralities of resource identifiers and the software identifier with providing a mapping among of them. The resource group may be defined as a logical group to an arbitrary resource assembly. For example, the resource assembly loaded into a certain virtual server may be defined as the resource group, and the resource assembly which composes the same cluster may be defined as the resource group.

Figure 19:
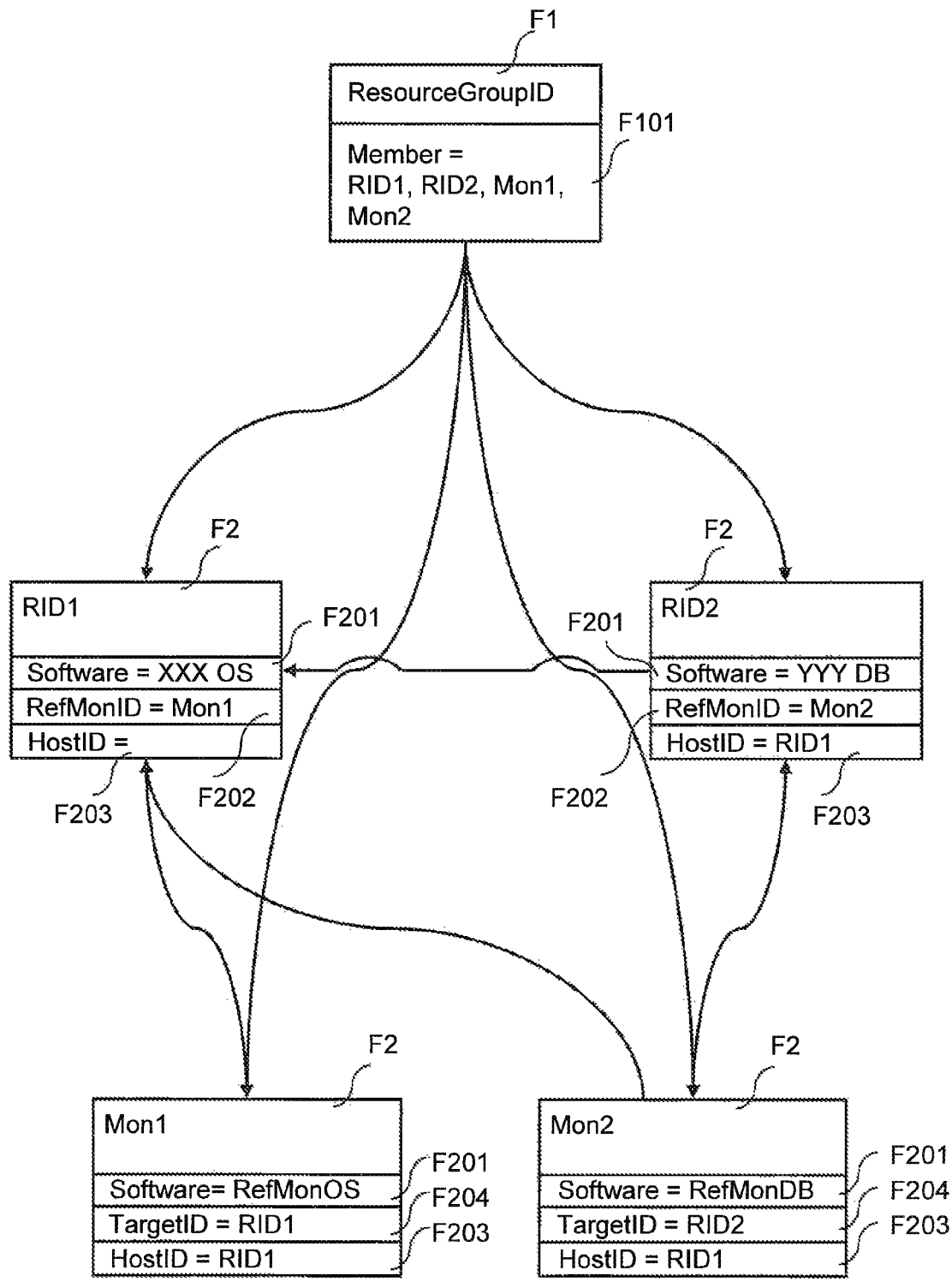
FIG. 19 is a figure showing an example of information which a resource management unit stores.

FIG. 19 is a figure showing an example of information which the resource management unit 511 stores. When referring to FIG. 19, the resource group identifier F1 and a plurality of the resource identifiers F2 are stored in the resource management unit 511.

Further, the resource management unit 511 is storing the resource identifiers which are correlated to the resource group identifier F1 as the member information F101. That is, 'RID1, RID2, Mon1, Mon2' are correlated to the resource group identifier F1 and stored in the resource management unit 511 as the member information F101. Here, RID1, RID2, Mon1 and Mon2 are resource identifiers F2 which are correlated to the resource group identifier F1 respectively.

Further, the resource management unit 511 is storing the software identifier F201, a reference monitor identifier F202 and the install destination resource identifier F203 with providing a mapping to the resource identifier F2.

The software identifier F201 is the information which indicates the software being applied to the resource which is indicated by the correlated resource identifier (hereinafter, referred to as a correspondence resource). The reference monitor identifier F202 indicates a reference monitor which monitors the correspondence resource. The reference monitor is software which performs access control to a resource (VM, a file, a table of database or the like) of the monitoring target. The install destination resource identifier F203 is the information which indicates the install destination resource in which the correspondence resource is installed.

The example of FIG. 19 indicates the relation that the database (RID2) and the reference monitors (Mon1, Mon2) are installed in the resource RID1 which is OS, and Mon1 and Mon2 perform the access control of RID1 and RID2 respectively.

Further, when the resource identifier F2 indicates the reference monitor, the resource management unit 511 may store the software identifier F201, the monitoring target resource identifier F204 and the install destination resource identifier F203 with providing a mapping to the resource identifier F2.

According to the fifth exemplary embodiment, the resource includes the reference monitor. This matter is also the same in the other exemplary embodiments.

The resource management unit 511 may manage a cluster as a resource group. In this case, the resource group identifier becomes identical with the cluster group identifier. The policy retrieving unit 502, when having received the cluster group identifier from the resource management unit 511, may read out the cluster policy corresponding to the cluster group identifier.

===Policy Distribution Unit 512===

The policy distribution unit 512 delivers at least either the software policy or the cluster policy which the verification unit 504 has verified as being correct to a predetermined resource.

Specifically, the policy distribution unit 512 specifies the resource identifier which is correlated to the above-mentioned software policy or cluster policy and stored in the policy storage unit 501. And, the policy distribution unit 512 delivers at least either the above-mentioned software policy or cluster policy to a specified resource.

In the latter case, the following case is assumed. The resource which has received the cluster policy is equipped with the function which performs the overwriting update of the software policy of the related software in the cluster based on the cluster policy information (that is, it has the cluster manager function).

Further, the reference monitor which is the access control software may be included as a delivery destination resource of the software policy.

The policy storage unit 501 may store the resource identifier and the identifier which indicates a computer having a resource indicated by the resource identifier (in-cluster server identifier) with providing a mapping between of them. In this case, the policy retrieving unit 502 reads out the cluster policy from the policy storage unit 501. The cluster policy is the cluster policy which is correlated to the install destination resource identifier read out from the resource management unit 511, the received resource identifier and the in-cluster server identifier which is correlated to the resource identifier.

FIG. 20 is a flowchart showing the outline of operation of the policy management system 50 according to the fifth exemplary embodiment.

The policy retrieving unit 502 receives a resource identifier from the resource management unit 511 (Step S101).

Next, the policy retrieving unit 502 reads out an install destination resource identifier which is correlated to the resource identifier received in Step S101 (Step S501).

Next, the policy retrieving unit 502 reads out a cluster policy and an update history, which are correlated to the resource identifier received in Step S101 and the install destination resource identifier read out in Step S501, from the policy storage unit 501 (Step S502). The policy retrieving unit 502 passes the read out update history to the policy update unit 503 and the verification unit 404.

Next, the policy retrieving unit 502 reads out a software policy and an update history, which are correlated to the resource identifier and the install destination resource identifier, from the policy storage unit 501 (Step S503). Further, the resource identifier is the resource identifier received in Step S101. Also, the install destination resource identifier is the install destination resource identifier read out in Step S501.

Further, in the processing of Step S503, the policy retrieving unit 502 may read out the software policy and its update history, which are correlated to the cluster policy read out in Step S502, from the policy storage unit 501. Specifically, the policy retrieving unit 502 may read out the software policy which is indicated by the software policy identifier included in the above-mentioned cluster policy from the policy storage unit 501.

Next, the policy update unit 503 outputs information based on the software policy and the update history which the policy retrieving unit 502 has read out (Step S402).

Next, the policy update unit 503 outputs information based on the cluster policy which the policy retrieving unit 502 has read out (Step S504).

Next, the policy update unit 503 updates at least any one of the software policy and the cluster policy based on the information which indicates the update processing (Step S403). The information which indicates the update processing is the information on at least any one of the software policy and the cluster policy which are inputted based on the outputted information.

That is, when an input of the information which indicates the update processing about the software policy is received, the policy update unit 503 updates the software policy. Also, when an input of the information which indicates the update processing about the cluster policy is received, the policy update unit 503 updates its cluster wear policy. When an input of the information which indicates the update processing about each of the software policy and the cluster policy is received, the policy update unit 503 updates the software policy and the cluster policy.

The policy update unit 503 passes at least either the updated software policy or cluster policy to the verification unit 504.

Next, the verification unit 504 verifies whether or not the software policy is correct based on the coincidence of the software policy received from the policy update unit 503 and the update history received from the policy retrieving unit 502 (Step S404).

Next, the verification unit 504 verifies whether or not the cluster policy is correct based on the cluster policy received from the policy update unit 503 and the verification rule received from the policy retrieving unit 502 (Step S505).

Next, the verification unit 504 makes a correlation among the software policy verified as being correct, the resource identifier and the install destination resource identifier, and stores (Step S405).

In Step S405, the resource identifier is the resource identifier which the policy retrieving unit 502 has received in Step S101. Also, the install destination resource identifier is the install destination resource identifier which the policy retrieving unit 502 has read out in Step S501.

Next, the verification unit 504 makes a correlation among the cluster policy verified as being correct, the resource identifier and the install destination resource identifier, and stores (Step S506).

In step S506, the resource identifier is the resource identifier which the policy retrieving unit 502 has received in Step S101. Also, the install destination resource identifier is the install destination resource identifier which the policy retrieving unit 502 has read out in Step S501.

Next, the policy distribution unit 512 delivers at least any one of the software policy and the cluster policy, which have been verified as being correct by the verification unit 504, to a predetermined resource (Step S507).

The predetermined resource is specified as follows. That is, the policy distribution unit 512 specifies the resource identifier which is correlated to the above-mentioned software policy or cluster policy and stored in the policy storage unit 501. The policy distribution unit 512 delivers at least either the above-mentioned software policy or cluster policy to the resource. The delivery destination may be a reference monitor.

The policy management system 50 according to the fifth exemplary embodiment takes the same effect as at least one of the policy update apparatuses according to the first exemplary embodiment to the fourth exemplary embodiment.

Moreover, by introducing a concept of the cluster, the policy management system 50 according to the fifth exemplary embodiment can set the software policy in a lump to a resource group in which virtual servers having the same software structure are clustered. That is, the policy management system 50 can easily change the setting of an individual computer according to the increase and decrease of computers composing the system, which occurs in the cloud environment.

According to the present invention, the policy update apparatus according to each exemplary embodiment can appropriately update the software policy corresponding to the configuration change in the resource.

Also, for each component in each exemplary embodiment of the present invention, its function can be realized by a computer and a program as well as being realized by hardware like. The program is provided by being recorded on a computer-readable recording medium such as a magnetic disk and a semiconductor memory, and read by the computer at a time of booting the computer or the like. The program having been read causes the computer, by controlling operation of the computer, to function as the component in each exemplary embodiment mentioned above.

While the present invention has been described with reference to the exemplary embodiments above, the present invention is not limited to the above-mentioned embodiments. Various changes in form and details of the present invention which can be understood by those skilled in the art may be made therein without departing from the spirit and scope of the present invention.

This application claims priority from Japanese Patent Application No. 2011-136487, filed on Jun. 20, 2011, the contents of which are incorporation herein by reference in their entirety.

FIELD OF INDUSTRIAL APPLICATION

The policy update apparatus and the policy management system according to the present invention can be applied to the integrated management technology of setting of the system in the multi-vendor or multi-platform environment.

DESCRIPTION OF THE REFERENCE NUMERALS

50 policy management system
100, 400, 500 policy update apparatus
101, 401, 501 policy storage unit
102, 402, 502 policy retrieving unit
103, 403, 503 policy update unit
404, 504 verification unit
191 CPU
192 communication I/F
193 memory
194 storage apparatus
195 input apparatus
196 output apparatus
197 bus
198 recording medium
511 resource management unit
512 policy distribution unit
A1, B1, C1, D1 software policy
A2, B2, D2, E2, F2 resource identifier
A3, B4, D3, E3, F203 install destination resource identifier
B3, C2, F201 software identifier
D4 update history
E1 cluster policy
E4 cluster group identifier
E5 in-cluster server identifier
E101 common setting
E102 individual setting
E103 list of software policy identifiers of in-cluster OS
E104 list of software policy identifiers of in-cluster DB
F1 resource group identifier
F101 member information
F202 reference monitor identifier
F204 monitoring target resource identifier

The invention claimed is:

1. A policy update apparatus comprising:
   a policy storage unit configured to store a software policy, which is setting information on a resource, with a mapping to a resource identifier which indicates said resource and an install destination resource identifier which indicates an install destination resource in which said resource is installed;
   a policy retrieving unit configured to receive the resource identifier, read out the install destination resource identifier which is correlated to said received resource identifier from a resource management unit which stores the resource identifier and the install destination resource identifier which indicates the install destination resource in which the resource identified by said resource identifier is installed with a mapping between them, and read out said software policy which is correlated to said received resource identifier and said read out install destination resource identifier from said policy storage unit; and
   a policy update unit configured to update said read out software policy, correlate said updated software policy to said received resource identifier and said read out install destination resource identifier, and store said updated software policy to said policy storage unit.

2. The policy update apparatus according to claim 1, wherein said policy storage unit is further configured to store the resource identifier, a software identifier which indicates software being applied to the resource identified by said resource identifier, the install destination resource identifier and the software policy with a mapping between them, and wherein said policy retrieving unit is further configured to receive the resource identifier and the software identifier, read out the install destination resource identifier which is correlated to said resource identifier from said resource management unit, and read out said software policy which is correlated to said resource identifier, said install destination resource identifier and said software identifier from said policy storage unit.

3. The policy update apparatus according to claim 2, wherein said policy storage unit a is further configured to store the software policy as a default policy with a mapping from the software policy to a software identifier, and wherein said policy retrieving unit is further configured to read out said default policy when said software policy which is correlated to the resource identifier, said install destination resource identifier and said software identifier does not exist in said policy storage unit.

4. The policy update apparatus according to claim 1, wherein said policy storage unit is further configured to store the resource identifier, the install destination resource identifier, the software policy, and an update history of said software policy with a mapping between them, wherein said policy update apparatus further comprises a verification unit, wherein said policy retrieving unit is further configured to pass the update history which is correlated to the read out software policy to said verification unit, and wherein said verification unit is configured to verify whether or not said software policy is correct based on the coincidence of the software policy updated by said policy update unit and the update history received from said policy retrieving unit.

5. The policy update apparatus according to claim 1, further comprising a verification unit, wherein said policy retrieving unit is further configured to pass a verification rule corresponding to the software policy read out from said policy storage unit to said verification unit, and wherein said verification unit is configured to verify the software policy updated by said policy update unit based on the verification rule received from said policy retrieving unit.

6. A policy management system comprising:

a policy update apparatus and a resource management unit, wherein the policy update apparatus comprises:

a policy storage unit configured to store a software policy, which is setting information on a resource, with a mapping to a resource identifier which indicates said resource and an install destination resource identifier which indicates an install destination resource in which said resource is installed;

a policy retrieving unit configured to receive the resource identifier, read out the install destination resource identifier which is correlated to said received resource identifier from a resource management unit which stores the resource identifier and the install destination resource identifier which indicates the install destination resource in which the resource identified by said resource identifier is installed with a mapping between them, and read out said software policy which is correlated to said received resource identifier and said read out install destination resource identifier from said policy storage unit; and a policy update unit configured to update said read out software policy, correlate said updated software policy to said received resource identifier and said read out install destination resource identifier, and store said updated software policy to said policy storage unit.

7. The policy management system according to claim 6, further comprising a policy distribution unit configured to deliver the software policy, wherein said resource management unit is further configured to store from a plurality of resource identifiers to one resource group identifier with a mapping between them, and wherein said policy distribution unit is further configured to read out the resource group identifier which is correlated to the resource identifier, which is correlated to said software policy and stored in said policy storage unit, from said resource management unit, and deliver the software policy which said policy update unit has updated to the resource indicated by a predetermined resource identifier which is correlated to said read out resource group identifier.

8. The policy management system according to claim 6, wherein said policy storage unit is further configured to store a cluster group identifier which indicates a cluster, an in-cluster server identifier which indicates a computer belonging to said cluster, the resource identifier, the install destination resource identifier and a cluster policy which is setting information on said computer with a mapping between them, wherein said policy management unit is further configured to store the resource identifier and the in-cluster server identifier which indicates the computer in which the resource indicated by said resource identifier is equipped with a mapping between them, wherein said policy retrieving unit is further configured to read out the cluster policy, which is correlated to the install destination resource identifier read out from said resource management unit, the resource identifier which said policy retrieving unit has received and the in-cluster server identifier which is correlated to said resource identifier and stored in said policy storage unit, from said policy storage unit, and wherein said policy update unit is further configured to update the cluster policy which said policy retrieving unit has read out, make a correlation among the updated cluster policy, said resource identifier and said install destination resource identifier, and store the updated cluster policy to said policy storage unit.

9. A policy update method comprising:

storing a software policy, which is setting information on a resource, to policy storage means with a mapping to a resource identifier which indicates said resource and an install destination resource identifier which indicates an install destination resource in which said resource is installed;

receiving the resource identifier, reading out the install destination resource identifier which is correlated to said received resource identifier from resource management means which stores the resource identifier and the install destination resource identifier which indicates the install destination resource in which the resource identified by said resource identifier is installed with a mapping between them, and reading out said software policy which is correlated to said received resource identifier and said read out install destination resource identifier from said policy storage means;
updating said read out software policy;
correlating said updated software policy to said received resource identifier and said read out install destination resource identifier; and
storing said updated software policy to said policy storage means.

10. A policy management method comprising:
storing a software policy, which is setting information on a resource, to policy storage means with a mapping to a resource identifier which indicates said resource and an install destination resource identifier which indicates an install destination resource in which said resource is installed;
storing the resource identifier and the install destination resource identifier which indicates the install destination resource in which the resource identified by said resource identifier is installed with a mapping between them to resource management means;
receiving the resource identifier;
reading out the install destination resource identifier which is correlated to said received resource identifier from said resource management means;
reading out said software policy which is correlated to said received resource identifier and said read out install destination resource identifier from said policy storage means;
updating said read out software policy;
correlating said updated software policy to said received resource identifier and said read out install destination resource identifier; and
storing said updated software policy to said policy storage means.

11. A non-transitory computer-readable recording medium including a policy update program which causes a computer to execute the processing which comprising:
a processing which stores a software policy, which is setting information on a resource, to policy storage means with a mapping to a resource identifier which indicates said resource and an install destination resource identifier which indicates an install destination resource in which said resource is installed;
a processing which receives the resource identifier, reads out the install destination resource identifier which is correlated to said received resource identifier from resource management means which stores the resource identifier and the install destination resource identifier which indicates the install destination resource in which the resource identified by said resource identifier is installed with a mapping between them, and reads out said software policy which is correlated to said received resource identifier and said read out install destination resource identifier from said policy storage means; and
a processing which updates said read out software policy, correlates said updated software policy to said received resource identifier and said read out install destination resource identifier, and stores said updated software policy to said policy storage means.

12. A policy update apparatus comprising:
policy storage means for storing a software policy, which is setting information on a resource, with a mapping to a resource identifier which indicates said resource and an install destination resource identifier which indicates an install destination resource in which said resource is installed;
policy retrieving means for receiving the resource identifier, reading out the install destination resource identifier which is correlated to said received resource identifier from resource management means which stores the resource identifier and the install destination resource identifier which indicates the install destination resource in which the resource identified by said resource identifier is installed with a mapping between them, and reading out said software policy which is correlated to said received resource identifier and said read out install destination resource identifier from said policy storage means; and
policy update means for updating said read out software policy, correlating said updated software policy to said received resource identifier and said read out install destination resource identifier, and storing said updated software policy to said policy storage means.

* * * * *